United States Patent [19]
Schneider et al.

[11] Patent Number: 6,130,398
[45] Date of Patent: Oct. 10, 2000

[54] PLASMA CUTTER FOR AUXILIARY POWER OUTPUT OF A POWER SOURCE

[75] Inventors: Joe Schneider, Menasha; Rick Hutchison, New London; Tim Matus, Appleton, all of Wis.

[73] Assignee: Illinois Tool Works Inc., Glenview, Ill.

[21] Appl. No.: 09/112,579

[22] Filed: Jul. 9, 1998

[51] Int. Cl.$^7$ .................................................. B23K 9/00
[52] U.S. Cl. ........................................ 219/121.39; 361/3
[58] Field of Search ........................ 219/121.39, 486, 219/130.1, 121.54, 121.57; 361/3, 251; 363/26; 318/467; 323/322

[56] References Cited

U.S. PATENT DOCUMENTS

| | | | |
|---|---|---|---|
| 3,916,283 | 10/1975 | Burrows | 363/26 |
| 4,364,003 | 12/1982 | Phipps | 318/467 |
| 4,831,231 | 5/1989 | Pelle . | |
| 4,918,285 | 4/1990 | Thommes . | |
| 4,922,363 | 5/1990 | Long et al. | 361/3 |
| 4,943,699 | 7/1990 | Thommes . | |
| 5,086,205 | 2/1992 | Thommes . | |
| 5,140,255 | 8/1992 | Tardio et al. | 323/322 |
| 5,510,952 | 4/1996 | Bonavia et al. | 361/251 |
| 5,611,950 | 3/1997 | Tochino et al. . | |
| 5,615,093 | 3/1997 | Nalbant . | |
| 5,617,013 | 4/1997 | Cozzi . | |

*Primary Examiner*—Teresa Walberg
*Assistant Examiner*—Quang Van
*Attorney, Agent, or Firm*—George R. Corrigan

[57] ABSTRACT

A plasma arc cutting power supply, and method of providing plasma cutting power, is disclosed. It includes a source of power having, preferably an engine or transformer based power source, that provides a main power output and an auxiliary power output. A two-state configuration circuit is in electrical communication with the auxiliary power output. The auxiliary power output receives voltage of a first magnitude with a non-floating ground when the configuration circuit is in its first state. The auxiliary power output receives voltage of a second magnitude, preferably different than the first magnitude, with a floating ground, when the configuration circuit is in its second state. When a plasma cutting circuit is connected to the auxiliary power output the configuration circuit is set in its second state. The plasma cutting circuit includes at least one chopper. A safety circuit that disables the plasma output includes a GFI or optical isolator.

25 Claims, 2 Drawing Sheets

PLASMA CUTTER FOR AUXILIARY POWER OUTPUT OF A POWER SOURCE

FIELD OF THE INVENTION

The present invention relates generally to the art of plasma cutters. More specifically, it relates to plasma cutters powered by the auxiliary power of an engine driven power supply.

BACKGROUND OF THE INVENTION

Plasma arc cutting is a process in which an electric arc is used to cut a metallic workpiece. Generally, plasma arc cutting uses an electric arc between an electrode and the metal to be cut. The arc creates a plasma that cuts the metallic workpiece.

It is generally accepted that 180 volts or higher open circuit is desirable to initiate a plasma arc cutting process. After the process has been initiated, the cutting arc voltage is approximately 90–125 volts.

A typical prior art plasma arc cutting power supply receives an input voltage (from a power line, generator, or other power source) and provides an output voltage to a pair of output terminals, one of which is the electrode and the other of which is connected to the workpiece or a pilot circuit. There are numerous types of known plasma arc cutting power supplies, such as magnetic (generator/alternator) power supplies, inverter power supplies, phase control power supplies, and choppers or secondary switchers. One known power supply is a chopper based power supply such as that shown in U.S. patent application Ser. No. 08/587,901, filed Jan. 16, 1996, entitled Plasma Cutting Or Arc Welding Power Supply With Phase Staggered Secondary Switchers, which is owned by the owner of this invention, and is hereby incorporated by reference.

Often, a plasma cutter is used for applications, and at locations, where electric arc welding is performed. Plasma cutting and welding have some similarities in that both receive an input power and transform or convert the input power into a usable voltage and current for the particular applications. However, plasma cutting is typically performed at a higher voltage then welding, thus an output power suitable for welding is generally not suitable for plasma cutting. At sites were line power is available it is relatively simple to connect the plasma cutter to one power outlet and the welding power supply to another power outlet.

Thus, at sites where an engine/generator is used it is more problematic to provide power for both the plasma cutter and welder. One solution is, of course, to provide a first engine/generator for plasma cutting and a second engine/generator for welding. However, this is relatively expensive in that two engines/generators must be provided.

One prior art attempt to avoid the need for two engine/generators is a plasma cutting power source called StarCut™, manufactured by PowCon, which converts a welding power output into plasma cutting power. (See e.g. U.S. Pat. No. 5,086,205.) However, this type of plasma cutter may be used only when welding is not being used, since it derives its power from the same output that is used for welding. Also, a boost convertor is needed to boost the voltage from a welding output to a plasma cutting output, and a dc input power source is needed.

One possible solution which can avoid the added expense of a second engine/generator is to use the auxiliary output of a welding power supply to power a plasma cutter. The auxiliary power of an engine drive power source typically ranges from 3,000 to 10,000 watts of electrical power. This power is used to run a wide variety of auxiliary equipment such as power tools and, possibly, plasma cutters, and is provided with a typical utility line receptacle or connector.

However, plasma cutters need to provide a floating output (i.e. not referenced to ground), and thus must be isolated from grounded power sources. A floating output is needed because it is relatively easy for the user to touch either output, and thus complete a current path to ground if the output is referenced to ground. This problem is particularly serious in plasma cutting, which is performed at a relatively high output voltage, 90 V e.g. (Other areas, such as welding, typically provide a lower output voltage, which is not as dangerous.) Also, the components in plasma cutters are designed to receive a floating input, and a grounded input could cause component failure or malfunction. As used herein, floating output or floating ground means the ground is not referenced to an external, fixed potential.

Typically, a transformer is used to safely isolate the output from the input. (See, e.g. U.S. Pat. Nos. 4,943,669 and 4,918,285.) The use of transformers results in a heavy power source. Alternatively, an inverter may be used, but such power sources are relatively complex and expensive. Thus, using such a prior art plasma cutter on the auxiliary power of an engine drive power source results in either a heavy, non-portable cutter or an expensive portable cutter.

The aux power on an engine/generator is typically a 115 or 230 VAC output (or other utility line voltage). The 230 VAC is obtained from the two 115 VAC outputs. There may be two secondary windings, having a common center tap which is tied to ground. The outer taps provide the 115 VAC or 230 VAC power, which is useful for tools, lights, etc. Thus, the aux power is not typically an isolated (from ground) source of AC power.

For example, a prior art auxiliary output from an engine/generator (such as that used to provide welding power) is shown FIG. 1. The transformer P1 includes a primary winding T1, and auxiliary windings S1 and S2. Transformer T1 (which may alternatively be a generator) typically includes another secondary winding (not shown) used for the welding output. There are two auxiliary outputs, each being 115 VAC. Connecting these outputs in series would provide a 230 VAC output, which is a desirable input for a plasma cutter. However, as shown in FIG. 1, the center leg is connected to ground so that both auxiliary 115 VAC outputs are grounded. Thus, the input to the plasma cutter would not float, as desired, and both outputs would be "hot" relative to ground. Touching either output would put the user at risk of shock. Even if the auxiliary power were isolated, it would be redundant (and expensive or heavy) to run a typical plasma cutter which also has primary isolation.

Accordingly, a plasma cutter capable of being powered by the auxiliary power output of an engine/generator, such as that used to power a welding power supply, is desired. Preferably, such a plasma cutter will receive about 230 VAC input and will provide a plasma cutting output. Additionally, such a plasma cutter will preferably include a ground fault interrupt and/or other protection circuits, to protect the user in case of improper connection, or ground failure.

SUMMARY OF THE PRESENT INVENTION

According to a first aspect of the invention a plasma arc cutting power supply provides a plasma cutting output to plasma cutting terminals. It includes a source of power having a main power output and an auxiliary power output, possibly provided by an engine/generator. A configuration circuit is in electrical communication with the auxiliary power output. The configuration circuit has a first state in which the auxiliary power output receives voltage of a first magnitude and has a non-floating ground. The configuration circuit has a second state in which the auxiliary power output receives voltage of a second possibly different, magnitude and has a floating ground.

A plasma cutting circuit, or a welding circuit, is in electrical communication with the auxiliary power output in one embodiment, and the plasma cutting circuit includes at least one chopper in electrical communication with the auxiliary power output in another embodiment.

At least part of the configuration circuit is located in the plasma cutting circuit in yet another alternative, and it may include a safety circuit. The safety circuit can disable the plasma output. The safety circuit includes a GFCI, an optical isolator, or a fuse connected to a relay contact, in various other alternatives.

The first magnitude is one-half the second magnitude, and the first magnitude is a utility line voltage in various embodiments.

The auxiliary output includes a first connector that receives the first voltage, and a second connector that receives the second voltage in yet another embodiment. When the configuration circuit is in the first state, no voltage is applied to the second connector, and when in the second state, no voltage is applied to the first connector. The first connector is a utility line type connector, and the second connector is not a utility line-type connector in other alternatives.

According to a second aspect of the invention a method of supplying a plasma cutting output to a pair of plasma cutting output terminals includes providing power, preferably from an engine, to a main power output and providing power to an auxiliary power output. It is determined if a plasma cutter is connected to the auxiliary power output. If the plasma cutter is not present a voltage of a first magnitude is provided to the auxiliary power output. If the plasma cutter is present a voltage of a second, possibly different, magnitude is provided to the auxiliary power output.

In one embodiment plasma cutting power is derived from the auxiliary power output and provided to the plasma output. In another embodiment the ground potential and a work potential are monitored and the plasma output is disabled in response to the monitoring, when predetermined conditions are met.

According to a third aspect of the invention a plasma cutter provides a plasma output to a work terminal and a cutting terminal, and includes a power input circuit and a configuration circuit. The configuration circuit provides a configuration control signal when a predetermined power is applied to the power input circuit. A plasma cutting circuit is in electrical communication with the auxiliary power output.

Other principal features and advantages of the invention will become apparent to those skilled in the art upon review of the following drawings, the detailed description and the appended claims.

Figure 1:
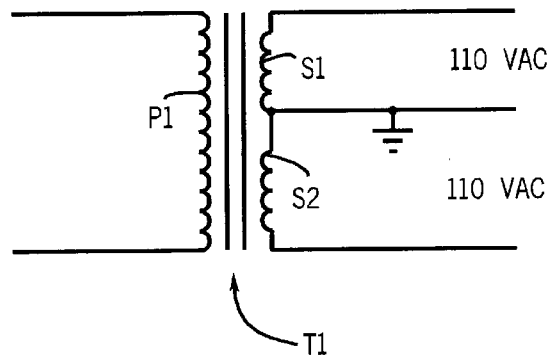
FIG. 1 is a prior art auxiliary output.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular circuit and implementation of this invention, it should be understood at the outset that the invention may also be implemented using other components, circuits, and environments.

Generally, the present invention includes a plasma cutter which is powered by the aux power from an engine/generator, such as that used to power a welding power supply. Preferably, the plasma cutter includes reconfiguration circuitry, including switches or relays and control circuitry, which causes the aux output of the engine/generator to be reconfigured from two 115 VAC outputs (or a 230 VAC output) with a center tap tied to ground, to a single 230 VAC output. The reconfiguring occurs in the engine/generator and is implemented using relays in the engine/generator in the preferred embodiment, although the various portions of the reconfiguration circuit may be located elsewhere. A ground fault interrupt, and a backup ground fault protection circuit, are included in the preferred embodiment, to protect against misconnection and improper usage, as well as a ground failure. The control circuitry which causes the output to be reconfigured is located in the plasma cutter in the preferred embodiment (although it may be located elsewhere).

Figure 2:
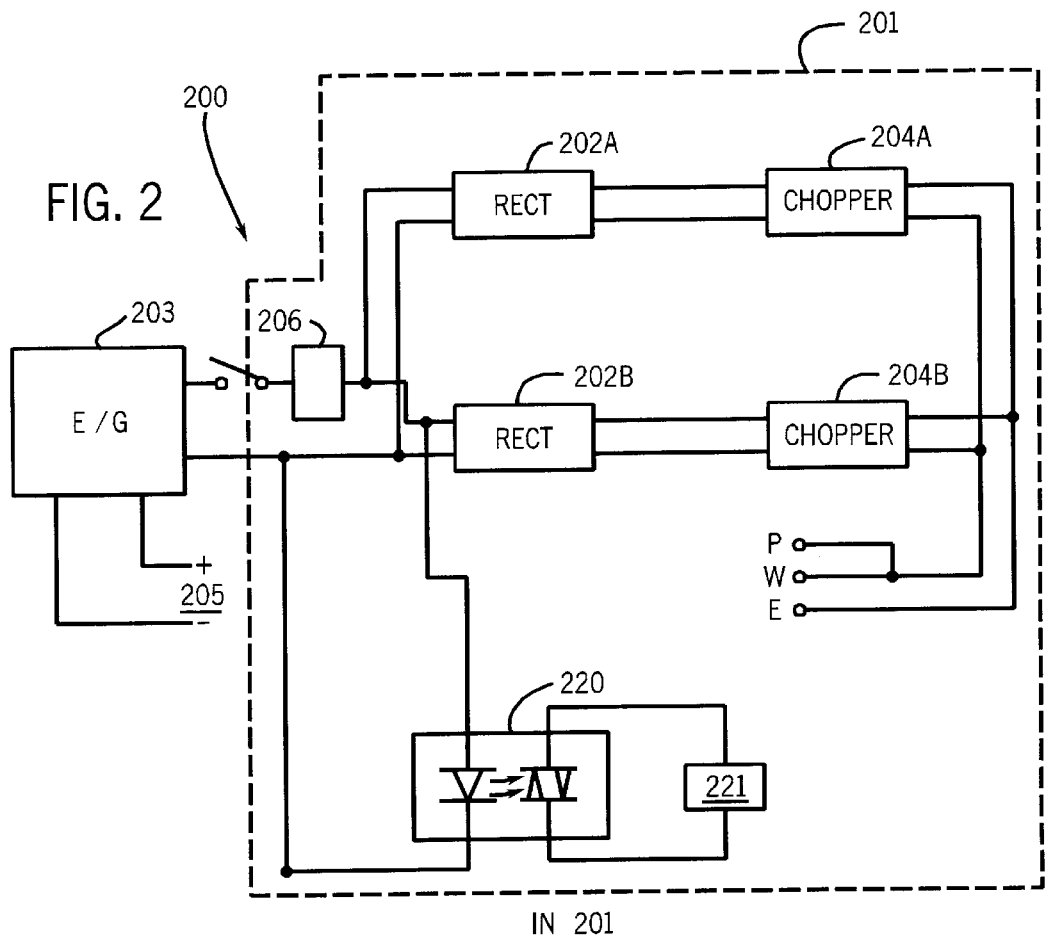
FIG. 2 is a diagram of a plasma cutter constructed in accordance with the present invention.

Referring now to FIG. 2, a plasma cutting system 200 includes an engine/generator 203 (which is a transformer or other power source in alternative embodiments) and a plasma cutter 201 (plasma cutter 201 is replaced with a welder in alternative embodiments). Engine/generator 203 is, in the preferred embodiment, a Bobcat® sold by the owner of the present invention, modified to have relays which allow it to provide a floating aux output. The Bobcat® engine/generator provides a welding output 205, as well as two 115 VAC aux outputs. In alternative embodiments it may be a welding power supply powered by line power, or other power sources. The output of engine/generator 203 is used as an input to plasma cutter 201, (called a plasma cutting circuit) and is reconfigured to provide a 230 VAC floating output. Other engine/generators may be used in other embodiments.

Plasma cutter 201 includes a pair of rectifiers 202A and 202B, and a pair of choppers 204A and 204B. Each chopper 204A and 204B includes a pair of phase staggered secondary switchers, such as that described in U.S. patent application Ser. No. 08/587,901. The outputs of the choppers are connected in parallel and provided to a work output W, an electrode output E, and a pilot arc output P. A GFCI 206 is provided to protect against ground faults. An optical isolator circuit 220, used to control the configuration of the output of generator 203 is provided across the input.

Figure 3:
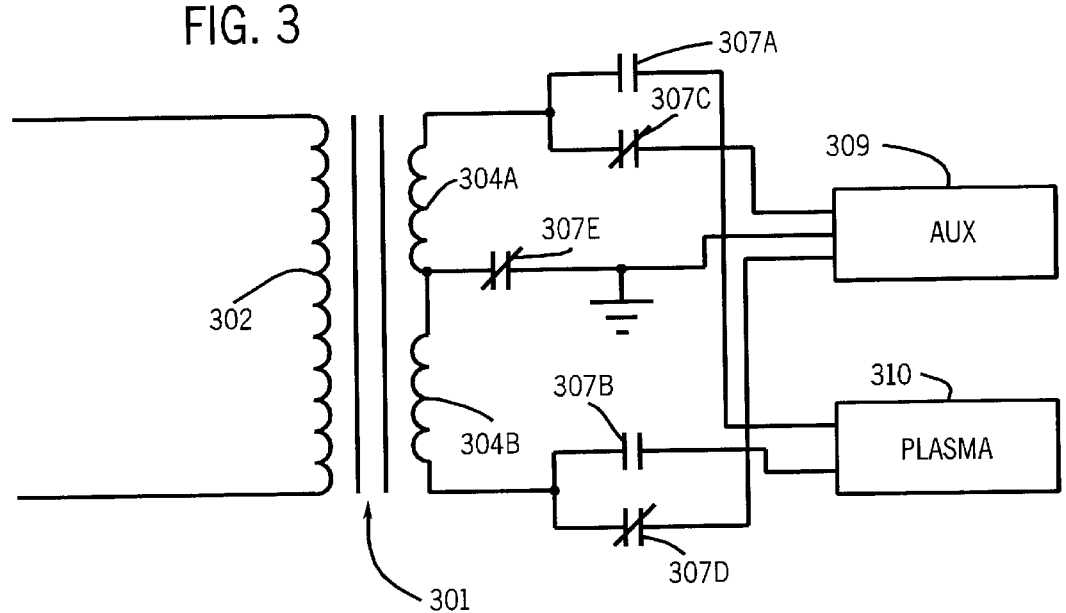
FIG. 3 is a diagram of an aux output with a reconfiguration circuit in accordance with the present invention.

One circuit which provides for reconfiguring the aux output for plasma cutting is shown in FIG. 3. An aux output transformer 301 includes a primary winding 302 and a pair of secondary windings 304A and 304B. Windings 304A and 304B are similar to windings S1 and S2 of the prior art shown in FIG. 1.

A plurality of relays 307A, 307B, 307C, 307D, and 307E connect the output of secondary windings 304A and 304B to an aux output 309 or a plasma cutting output 310. Relays 307C, D and E are normally closed relays, and are used to provide the aux power. A ground is provided to the center tap of secondaries 304A and 304B through normally closed relay 307E. Under normal operation (i.e. when aux power is to be provided) relays 307A and 307B are open, while relays 307C, 307D, and 307E are closed. Thus, aux power output 309 receives the center tap, and the voltage from windings 304A and 304B.

Conversely, when plasma cutting is to be performed, relays 307A and 307B are closed, and the remaining relays are open. Thus, the center tap of secondaries 304A and 304B is de-coupled from ground, and the full 230 VAC aux output is provided to plasma output 310. In summary, when aux power is provided, the chassis of the Bobcat® is tied to the center tap of transformer 301 referencing the output to ground, and when plasma power is provided, the chassis of the Bobcat® is not tied to the center tap and the output floats.

The preferred embodiment provides that relays 307A and 307B are open unless a specific command signal is received from a plasma cutter attached to plasma output 310. This helps to insure that if the plasma cutter is not attached, the normal aux output will be provided. The preferred embodiment further provides a plasma output having a connection different from the aux output connection. Thus, when the plasma output is being used, the aux outputs are disabled and all of the aux power is directed to the plasma output. Alternative embodiments provide that the aux power and plasma power outputs use the same output connections. In this embodiment, if there are several aux output plugs, aux power may be provided to other tools while plasma cutting is being performed.

Plasma cutter 201 does not include its own output isolation; rather it uses the isolation provided by the engine/generator. Thus, if the plasma cutter were plugged into a 230 VAC, no isolation would be provided. A dedicated (i.e., not a utility line-type) connector is provided for plasma cutter 201 so that it may not inadvertently be connected to a typical 230 VAC receptacle. The plug includes five or seven pins in the preferred embodiment, which includes the 230 VAC power lines, as well as control lines.

Additional protection is provided by a safety circuit in one embodiment. Referring to FIG. 2, optical isolator circuit 220 is connected across the input to plasma cutter 201. The output of optical isolator circuit 220 is provided to a control circuit 221 which enables or disables the plasma cutter output. Thus, if a user attempts to connect the 230 VAC input lines of plasma cutter 201 to a 230 VAC line voltage, plasma cutter 201 will be disabled.

Another safety circuit to prevent problems when plasma cutter 201 is improperly connected uses commercially available ground fault interrupt (GFI) 206 connected to a relay in the input circuit. If the two hot leads connected to the GFI don't balance, then it opens the relay, shutting down the power source. Another alternative includes using isolation windings in plasma cutter 201.

Figure 4:
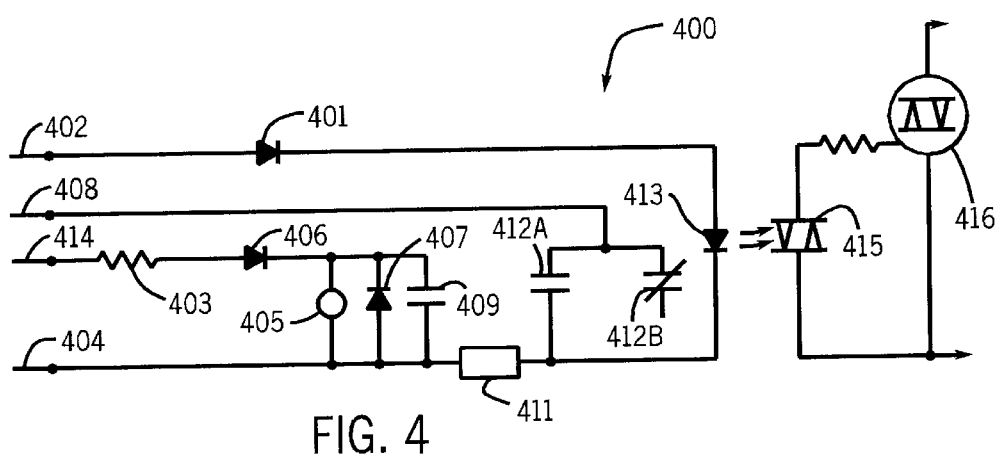
FIG. 4 is a diagram of a safety circuit in accordance with the present invention.

The commercial GFI is backed up by, or replaced by, a safety circuit such as that shown in FIG. 4 in various alternative embodiments. One advantage of such a circuit is the ability to tune it to the particular plasma cutter so that it trips consistently (shortly after the GFI if a GFI is used). While the circuit described below is not as fast as a commercially available GFI, it can be tailored to be as fast or faster than the GFI. It can also be made to operate a fuse or a resettable circuit breaker.

The circuit of FIG. 4 helps protect operators from potential shock hazards due to ground fault conditions. Power sources (welding, plasma cutting or other) are designed so that the outputs are floating electrically. This means there is no "return path" from the outputs to ground. If there is a return path, the operator or others in contact with the outputs and ground would be subject to an electrical shock of some level. The circuit of FIG. 4 continually monitors the work output of the power source and disables plasma cutter output power when a significant potential between the outputs and ground exists. (The electrode could alternatively be monitored). Generally, the circuit of FIG. 4 can blow a fuse or trip a resettable breaker in milli-seconds. The amount of time-to-trip can be tailored to fit the need of the product.

The circuit of FIG. 4 is preferably disposed within plasma cutter 201, and includes an input 414 connected to work output W, an input 408 connected to a source of power referenced to ground on the engine (such as a winding), and an input 402 connected to a battery, and an input 404 connected to ground. If a potential difference between 414 and 404 develops, then a relay control coil 405 will energize through a resistor 403 (4.37K ohms) and a diode 406. Such a potential difference is the ground fault condition to be protected against. Resistor 403 and a capacitor 409 (100 $\mu$F) set the time constant for the energizing of coil 405. The contact 412 of coil 405 shorts out an 18 VAC voltage supply (to ground) through a 2 amp slow-blow fuse 411 when coil 405 is energized. Fuse 411 blows quickly (a few milli-seconds) and disables an optical isolator 413, which may be similar to isolator 220 (FIG. 2). Then optical isolator 413 opens the main contactor (relay), thereby disabling output. A diode 407 protects relay 405 on turn off (snubber). A diode 406 rectifies the voltage being detected so that the time constant of resistor 403 and capacitor 409 is relatively consistent.

Numerous modifications may be made to the present invention which still fall within the intended scope hereof. Thus, it should be apparent that there has been provided in accordance with the present invention a method and apparatus for plasma cutting that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A power supply for providing a plasma cutting output to a pair of plasma cutting output terminals, comprising:
   a source of power, including a main power output and an auxiliary power output; and
   a configuration circuit in electrical communication with the auxiliary power output, wherein the configuration circuit has a first state in which the auxiliary power output provides a voltage of a first magnitude and has a non floating ground in response to a plasma cutter not being connected to the auxiliary power output, and wherein the configuration circuit has a second state in which the auxiliary power output provides a voltage of a second magnitude and has a floating ground in response to the plasma cutter being connected to the auxiliary power output.

2. The apparatus of claim 1 wherein the source of power includes an engine/generator power output.

3. The apparatus of claim 1 further including a plasma cutting circuit in electrical communication with the auxiliary power output.

4. The apparatus of claim 3 wherein the configuration circuit includes at least one relay in electrical communication with the auxiliary power output.

5. The apparatus of claim 3 wherein the plasma cutting circuit includes at least one chopper in electrical communication with the auxiliary power output.

6. The apparatus of claim 3 wherein the configuration circuit includes a control circuit located in the plasma cutting circuit.

7. The apparatus of claim 3 wherein the source of power includes a transformer.

8. The apparatus of claim 6 wherein the configuration circuit includes a safety circuit in electrical communication with the auxiliary power output and in electrical communication with the plasma output, whereby the safety circuit can disable the plasma output.

9. The apparatus of claim 8 wherein the safety circuit includes a ground fault circuit interrupt.

10. The apparatus of claim 8 wherein the safety circuit includes an optical isolator.

11. The apparatus of claim 8 wherein the plasma output includes a work output and the safety circuit includes relay coil connected across a floating ground and the work output, and a fuse connected to a relay contact, wherein when the fuse is open and the plasma output is disabled.

12. The apparatus of claim 1 wherein the first magnitude is different than the second magnitude.

13. The apparatus of claim 12 wherein the first magnitude is a utility line voltage.

14. The apparatus of claim 1 wherein the auxiliary output includes a first connector that receives the voltage of a first magnitude, and a second connector that receives the voltage of a second magnitude, and wherein when the configuration circuit is in the first state no voltage is applied to the second connector, and wherein when the configuration circuit is in the second state no voltage is applied to the first connector.

15. The apparatus of claim 14 wherein the first connector is a utility line type connector, and the second connector is not a utility line-type connector.

16. A power supply for providing a plasma output to a pair of plasma cutting output terminals, comprising:

means for providing a main electrical power output and an auxiliary power output; and a configuration circuit means for configuring the auxiliary power output to be floating or referenced to ground, in response to the presence or absence of a plasma cutter being connected to the auxiliary power output, wherein the configuration circuit means is in electrical communication with the auxiliary power output.

17. The apparatus of claim 16 further including a plasma cutting circuit means for providing cutting power to the output terminals.

18. The apparatus of claim 17 wherein the configuration circuit means includes a controller located in the plasma cutting circuit means.

19. The apparatus of claim 18 wherein the configuration circuit means includes a safety circuit means for disabling the plasma output.

20. The apparatus of claim 19 wherein the auxiliary output includes a first connector that receives the first voltage, and a second connector that receives the second voltage, and wherein when the configuration circuit is in the first state no voltage is applied to the second connector, and wherein when the configuration circuit is in the second state no voltage is applied to the first connector.

21. The apparatus of claim 20 wherein the first connector is a utility line type connector, and the second connector is not a utility line-type connector.

22. A method of supplying a plasma cutting output to a pair of plasma cutting output terminals, comprising:

providing power to a main power output;

providing power to an auxiliary power output; and determining if a plasma cutter is connected to the auxiliary power output;

the auxiliary power output provides a voltage that is referenced ground if the plasma cutter is not present; and the auxiliary power output provides a voltage that is floating if the plasma cutter is present.

23. The method of claim 22 wherein the steps of providing power includes providing power from a generator.

24. The method of claim 22 further including the step of providing plasma cutting power derived from the auxiliary power output.

25. The method of claim 22 further including the step of monitoring the ground potential and a work potential, and disabling the plasma output in response to the monitoring when predetermined conditions are met.

* * * * *